United States Patent [19]

Liedtke

[11] 4,145,118

[45] Mar. 20, 1979

[54] VIEWING INSTRUMENT

[76] Inventor: Dieter W. Liedtke, Unterbösch, Hünenberg, Zug, Switzerland

[21] Appl. No.: 736,691

[22] Filed: Oct. 29, 1976

[51] Int. Cl.$^2$ ............................................. G02B 27/02
[52] U.S. Cl. ..................................... 350/241; 242/76;
350/133; 350/239
[58] Field of Search ................... 350/241, 255, 36, 37,
350/133, 134, 239; 242/76; 206/159; 351/38

[56] References Cited

U.S. PATENT DOCUMENTS

| | | | |
|---|---|---|---|
| 1,167,425 | 1/1916 | Ott | 350/32 |
| 1,240,905 | 9/1917 | Troppman | 350/32 |
| 2,337,567 | 12/1943 | North et al. | 350/241 |
| 2,372,192 | 3/1945 | Fassel | 350/241 |
| 2,627,781 | 2/1953 | Weborn | 350/239 |
| 3,850,505 | 11/1974 | Ratliff | 350/133 |
| 3,891,159 | 6/1975 | Nelson | 242/76 |
| 3,891,311 | 6/1975 | Fletcher et al. | 351/38 |
| 3,967,788 | 7/1976 | Ponce | 242/76 |

*Primary Examiner*—John K. Corbin
*Assistant Examiner*—B. Wm. de los Reyes

[57] ABSTRACT

An instrument for the individual viewing of pictures disposed successively on a transparent film strip, with a housing in which a binocular viewing window and a lens system enlarging the viewing angle and located in the ray path between viewing window and object are provided, and with holding and guiding means holding the film strip in a viewing plane, wherein the beam paths or optical axes associated with the two viewing windows are brought together approximately in the center of a common picture aperture lying in the viewing plane, and wherein the film strip guiding and holding means has a back support which supports the film strip during the positive and/or frictional engagement of an externally operable mechanical transport device with the film.

5 Claims, 4 Drawing Figures

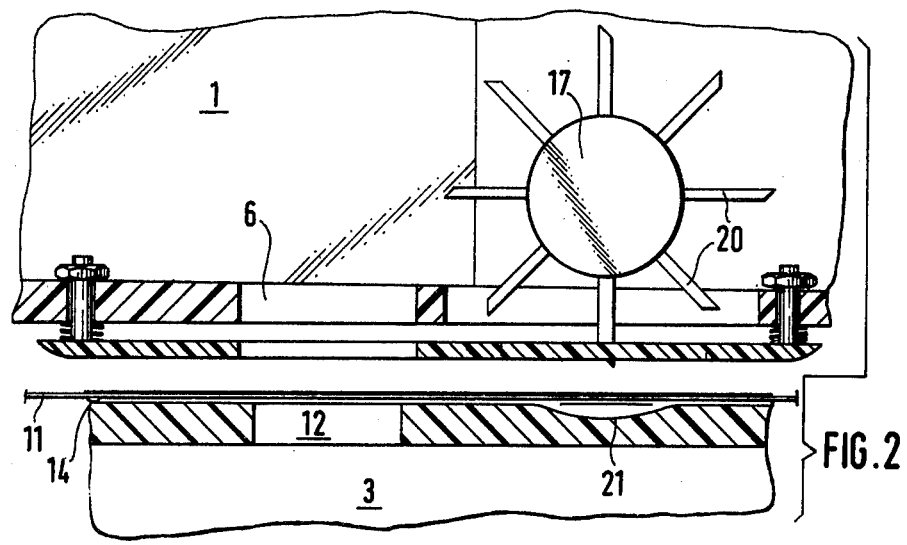
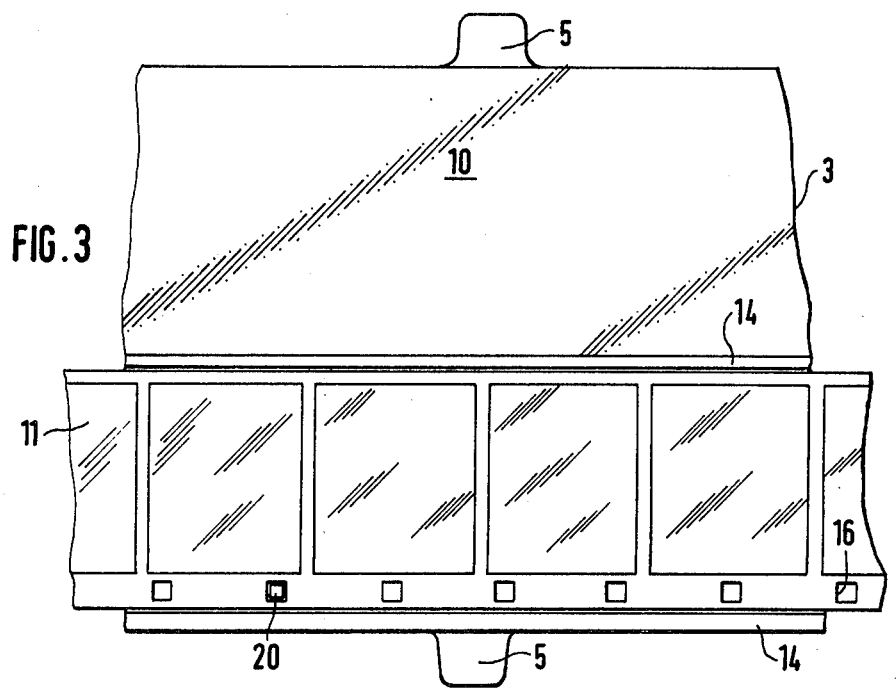
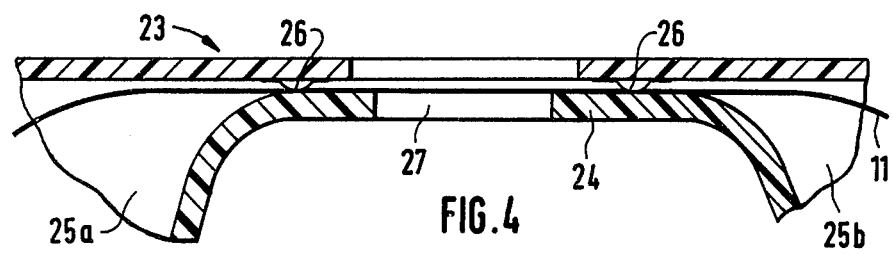

VIEWING INSTRUMENT

BACKGROUND

The invention relates to an instrument for the one-by-one viewing of pictures arrayed successively on a transparent film strip, having a housing in which there is provided a viewing window and, in the light-ray path between the viewing window and the object, a lens system which magnifies the viewing angle, and having means for holding and guiding the film strip in a viewing plane.

Instruments of this kind are known for the stereoscopic viewing of still pictures. They are constructed much like field-glasses, independent light-ray paths and different transparent pictures being associated with each of the two viewing windows. The transparent pictures, or diapositives, are disposed opposite one another in pairs on a rotary disk. The two simultaneously viewed diapositives produce the stereoscopic effect. This instrument offers the desirable possibility of binocular viewing, but it is very limited in the number of pictures that can be viewed in a continuous series on account of the necessarily circular configuration of the picture carrier. The fact that two frames must be provided on the picture carrier for each picture imposes an additional limitation upon the number of pictures in a sequence.

THE INVENTION

The invention sets out from the consideration that the principle of binocular viewing of still pictures illuminated by an outside source will be broadly useful only if a great series of pictures can be viewed successively and without the nuisance of changing picture carriers, because in the case of a short series of pictures, and hence a sequence of small informational content, a viewing instrument of this kind—if one disregards the stereoscopic effect—is unnecessary, since comparable information can also be contained on a directly readable information vehicle.

It is therefore the object of the invention to make available a picture viewing instrument of the kind described in the beginning, which will be inexpensive to manufacture and easy to operate, while permitting the continuous viewing of a very great number of individual pictures disposed on a picture carrier.

For the achievement of this object, it is proposed in accordance with the invention that the light-ray paths or optical axes associated with the two viewing windows be brought together approximately in the center of a common picture aperture located in the viewing plane, and that the film guiding and holding means have a back support to support the film strip during the film-driving engagement of a part of an externally operated mechanical transport means. The focusing together of the optical axes for binocular viewing of a frame is known in binocular microscopes. The complex prism systems used therein for beam splitting, however, would make the instrument impractical for economic reasons for the viewing of large series of pictures. The apparatus of the kind that is involved here serves for the purpose of making the picture information on a film strip serving as the picture carrier accessible to the user, doing so in such a manner as to provide him with the comfort and convenience offered by binocular viewing. The instrument must therefore be extremely inexpensive to manufacture, by being made of plastic parts for example, and must make use of film cassettes so as to avoid complex film threading operations.

The invention is therefore further developed by providing on the outside of the housing, adjacent the picture window, a socket or slot for the insertion of a film strip casse, by forming the back support of the guiding and holding means on a wall of the cassette which defines the viewing plane, and by providing the cassette wall defining the viewing plane with an aperture which is in line with the object and forms a picture aperture. Preferably, the socket or slot has guiding ribs and/or grooves to mate with corresponding grooves and/or ribs formed on the outside of the cassette, and a resilient detent means for locking the cassette in its proper position in front of the housing aperture.

In a desirable embodiment of the invention, the film strip has a series of perforations parallel with the series of pictures, and is in the form of an endless band; a magazine is provided in the cassette and has a height corresponding approximately to the width of the film strip, and the guiding and holding means is so constructed that the film strip intersects the light beam only at the picture aperture which is offset from the magazine. In this embodiment the light beam passes through the picture aperture alongside and approximately parallel to the flat side of the magazine, and one of the narrow sides of the magazine is extended laterally to form the film gate provided with the picture aperture. The film strip, which can be of the super-8 format, for example, is drawn by the film transport from the magazine, fed frame by frame past the picture aperture, and from there back into the magazine. At the end of the series of pictures, the beginning of the film series will again appear before the picture aperture, without the need for rewinding.

To prevent damage to the film strip, especially when the cassette is replaced, a film gate with the picture aperture is disposed within the cassette, and the holding and guiding means is so constructed that the film strip is guided within the cassette. The light-ray path from the light source to the two viewing windows must be free and open through the picture aperture just as in the other embodiments of the invention.

In an alternative embodiment, the picture aperture is created in a bridge-like part of a cassette, which joins together two spool chambers each of which contains one end of the film wound within it. In the cassette, which is attached at right angles to the plane of the eyes, as a rule, for reasons of photographic technology, a film strip having two parallel picture tracks can be used in this embodiment to increase the information content in the picture carrier, in the manner, for example, of the known double-eight continuous picture film. After the one picture track has been displayed, the cassette, which is disposed asymmetrically in relation to the picture aperture, is rotated by 180°, and then the other picture track can be viewed without rewinding.

In further development of the invention, the back support is formed on a resilient film gate. The resilient film gate facilitates the engagement of the moving part of the transport means as required for the film transport, without harming the film. In a preferred embodiment, the transport means is a sprocket or claw mounted in the housing, which engages the film perforations and is brought out of the housing by means of a shaft disposed approximately parallel to the plane of the eyes. The shaft can be rotated from without by means of a knurled knob in order to advance the film strip by one frame.

Within the scope of the invention, however, pull-down claw systems, as known in motion picture projectors, can be used for the stepwise advancement of the film strip. It is furthermore possible to accomplish the transport of the film by means of a spindle engaging a take-up spool of the cassette.

In an embodiment of particularly simple construction, the optical axes in the plane of the eyes merge rectilinearly from the two viewing windows to the center of the picture aperture. In this embodiment, each viewing window must be sufficiently far away from the picture aperture to avoid having to cross the eyes excessively in viewing the picture. It has been found, however, that a distance of about 10 to 15 cm between the viewing windows and the viewing plane is sufficient for comfortable viewing. The resultant length of the housing offers the advantage that it is more convenient to operate the transport means at a greater distance from the eyes.

Alternatively, provision is made for disposing two totally reflecting mirrors in the lines of sight between the picture apertures and the two viewing windows. Due to the resultant reflection, the viewing distance is increased, the optical axes being able to be even parallel in the vicinity of the two viewing windows. The mirror surfaces can be made at extremely low cost on appropriate plastic surfaces by vapor coating or by covering with a reflective film.

Molded plastic lenses are entirely adequate for the lens system for the purposes of the invention.

The invention will now be further explained with the aid of the embodiments represented in the appended drawings wherein:

FIG. 2 is an enlarged partial cross sectional view taken along line II—II of FIG. 1;

FIG. 3 is a top view taken in the direction III—III of FIG. 2, and

FIG. 4 is a partial cross sectional view through a film strip cassette which can be used in another embodiment of the viewing instrument.

Figure 1:
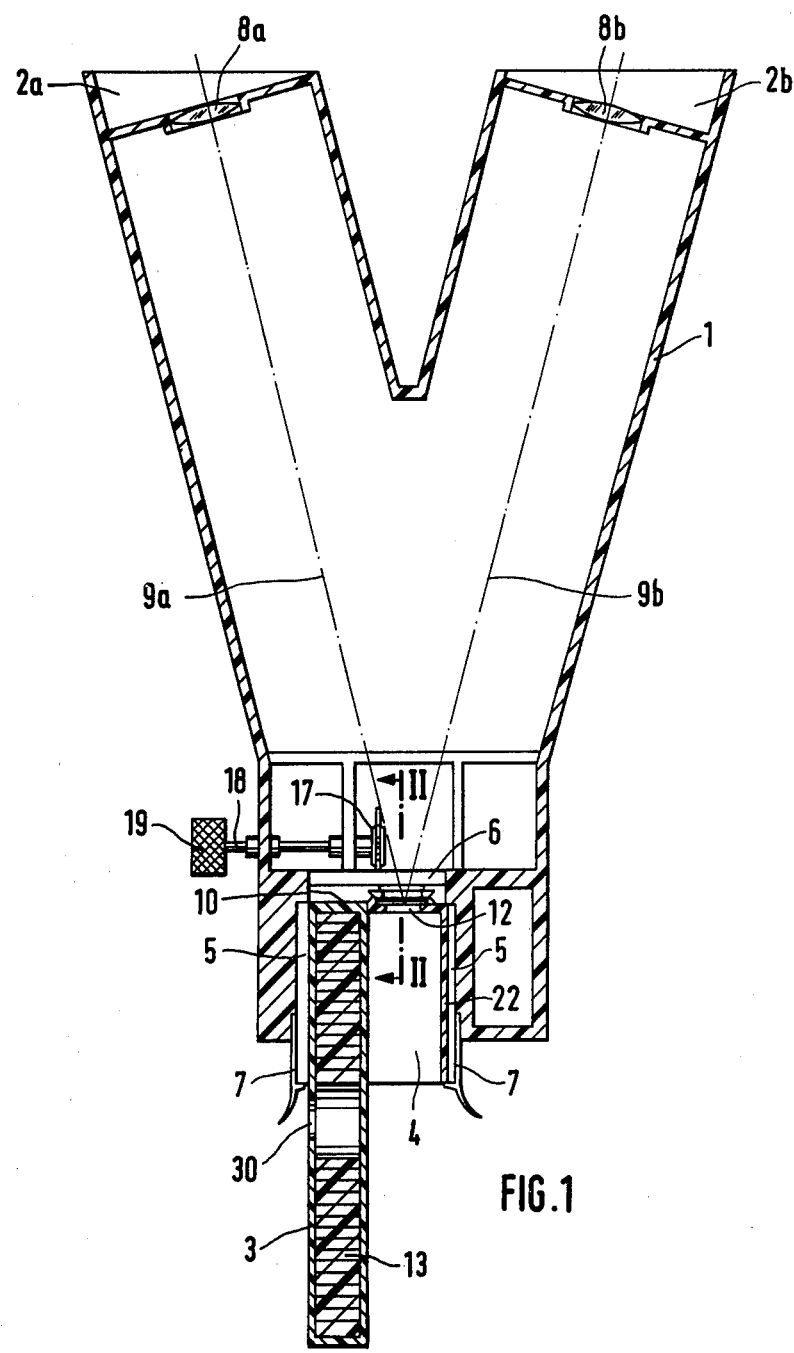
FIG. 1 is a cross-sectional view taken along the ocular plane of an embodiment of the viewing instrument in which the picture carrier is an endless film strip contained in a cassette.

The viewing instrument represented in cross section in FIG. 1 has a housing 1 with a binocular viewing window 2a-2b, and a cassette 3 holding and guiding the film strip, and forming the object 4 of the instrument. The cassette 3 is inserted releasably approximately in the viewing direction in the embodiment represented, into a front portion of apparatus 1 which is provided with straddling projections, ribs 5 formed on the two outer sides of cassette 3 mating with grooves of corresponding shape on the inner surfaces of the front projections. The cassette 3 is held in its proper position before the aperture in the housing by resilient clips or catches 7 which engage the guiding ribs 5 when the cassette is in the proper position, and can be bent outwardly against their spring bias to release the cassette.

The housing 1 is preferably injection molded of plastic and can be composed of two plastic shells associated together approximately in the ocular plane. Since the picture in the picture carrier, which is not shown in the drawing, is relatively small to increase the information content within small film strip dimensions, a lens system to enlarge the viewing angle is needed, which consists in this embodiment of two convergent lenses 8a and 8b, each fastened at the viewing windows 2a and 2b, respectively in the housing. The lenses 8a and 8b are coordinated with the length of the two corresponding optical axes 9a and 9b such that a sharp imaging of the plane in which the optical axes 9a and 9b converge is produced at the corresponding viewing window 2a and 2b.

The image plane disposed transversely of the ocular plane (drawing plane of FIG. 1) is, in this embodiment, formed at the face 10 of cassette 3 facing the housing 1. The visible transparency is framed on the viewer's side by the picture aperture 12 formed in the front face of the cassette. When the cassette 3 is in the proper position, therefore, the picture aperture is aligned with the housing aperture 6 in the lines of sight 9a, 9b. The housing aperture 6 is preferably large enough to permit an unhampered viewing of the picture through picture apertures 12 of different formats and positions.

The film strip 11, which in the embodiment shown in FIG. 1, is in the form of an endless band and is rolled up in a magazine 13, is carried past the picture aperture 12 while being guided on both sides by guiding ribs 14, so that it moves at right angles to the plane of viewing, within the interstice between the face 10 of cassets 3 and housing 1. As best seen in the enlarged view in FIG. 2, a pressure plate 15, mounted resiliently in the direction of viewing, is provided on the housing, which holds the film strip 11 in contact with the face 10 of the cassette and hence approximately in the plane of observation. (In FIG. 2, the cassette 3 is shown as spaced away from the housing 1 for the sake of clarity.) The pressure plate 15 is apertured opposite the picture aperture 12 in a manner that is known in film projectors.

As best seen in FIG. 3, the film strip 11 has a perforated margin 16 by which the strip can be advanced with the aid of the sprocket 17 represented in FIGS. 1 and 2 or with the aid of a pull-down claw system. The sprocket 17 is mounted rotatably in housing 1 on an axis disposed at right angles to the film transport means. The shaft 18 associated with the sprocket 17 is carried out of the housing 1 and terminates in a knurled knob 19. By turning the knurled knob 19 joined to sprocket 17 by shaft 18, the film strip 11 guided past the picture aperture 12 can be advanced in the direction of the guiding ribs 14. The sprocket 17 has radial teeth 20 disposed at equal angular intervals, which pass through the housing wall adjacent the picture aperture and through the pressure plate 15 which is provided with an aperture at that point, to engage the perforations in the film. The face 10 of the cassette 3 forms a back support when the drive teeth engage the film and prevents the film strip from escaping from such engagement. A shallow recess 21 is formed in the guidance path of film strip 11 at the point of engagement of the sprocket teeth, and permits a deep engagement of the teeth 20 to assure reliable film transport.

In the cassette configuration represented in FIG. 1, the illumination ray path through object chamber 4 is kept free by disposing the picture aperture in a side chamber of the cassette, i.e., a chamber beside the magazine 13. This side chamber is open in the direction of a light source not shown in the drawing (downwardly in FIG. 1) for the unhampered access of light to the picture aperture 12. To increase the light input it is desirable to provide the inside walls of the side-chamber forming the object chamber with a light-reflective coating or to make it of light-colored material. The wall 22 of the side chamber, which is parallel to the flat sides of the magazine chamber 13, serves in the present embodiment as the wall which carries a rib 5. When the cassette 3 is applied unilaterally or to other walls on the housing 1, the wall 22 can be omitted in order to increase the access of light to the picture aperture 12.

The endless film strip is wound up in a roll in the magazine 13, emerges from the magazine approximately axially on the flat side of the cassette facing away from the object chamber 4, through the opening 30; it is carried past the picture aperture 12 through the lines of sight 9a and 9b of the viewing instrument, and finally it is introduced tangentally back into chamber 13 and wound onto the spool again.

The film strip 11 can also be completely enclosed and guided within the cassette, in which case the film gate with the picture aperture is formed in the cassette. Such a film strip arrangement facilitates the changing of the cassette and prevents film damage by improper handling, since the film strip 11 is not accessible from without.

In FIG. 4 there is shown another embodiment of a cassette 23 for a viewing instrument of the kind described. In this embodiment, a film gate is formed in a bridge portion 24 which joins together two spool chambers 25a and 25b. The film strip 11 is held in front of the picture aperture 27 in the viewing plane by means of resilient hold-downs 26 in the bridge portion. One end of the film is wound in each of the spool chambers 25a and 25b. In the cassette design represented in FIG. 4, the guides for the insertion of the cassette into a corresponding opening in housing 1 are best disposed at right angles to the ocular plane of the instrument. In this manner the object side of the bridge portion 24 can be kept fully unobstructed for the access of light.

In the cassette embodiment represented in FIG. 4, it is advantageous to use a film strip 11 provided with two parallel picture tracks and with perforations on both margins. After the one picture track has been viewed through the picture aperture 27, the cassette 23 is turned 180° about the optical axis, thus bringing the other picture track into the viewing path so that it can be viewed.

Within the scope of the invention, many variants of the above-described embodiments are possible. For example, a pull-down claw system known in connection with film transports in projectors or motion picture cameras can be used for the film transport. A reduction of the size of housing 1 can be achieved by doubling the lines of sight 9a and 9b back on one another by means of appropriately disposed mirrors, the basic system of the binocular viewing of a picture being preserved. The picture aperture can be provided with a transparent plastic or glass pane.

The viewing instrument described permits the direct viewing of individual pictures of a motion picture film of the super-8 mm size, for example. Pictures can be taken with a conventional motion picture camera set for single frame operation, and after the film has been developed and installed in an appropriate cassette, it can be viewed with the viewing instrument. When this photographic technique is used, the longer dimension of the picture aperture will be disposed parallel to the ocular plane.

I claim:

1. An instrument for the individual viewing of pictures disposed successively on a transparent film strip, comprising: a housing with a binocular viewing window; a housing aperture; a lens system enlarging the viewing angle of the instrument and located on the optical axis between the binocular viewing window and housing aperture, an endless strip forming said transparent film strip, a cassette having a magazine for receiving the major portion of said endless strip, said magazine having two flat sides arranged parallel to each other and spaced from each other by approximately the width of said endless strip, said endless strip being wound up in said magazine between said two flat sides and being guided in a closed loop out of the magazine and back into the same; a side chamber formed adjacent one of said flat sides of the magazine, said side chamber comprising a guiding wall provided with a picture aperture arranged laterally offset with respect to the magazine, said side chamber being open at a back side opposite the picture aperture, said film strip outside the magazine being held for viewing picture by picture along the optical axis between the binocular viewing window and the housing aperture; holding means for detacheably mounting the magazine at said housing, including means for aligning the picture aperture with the optical axis between said binocular viewing window and said housing aperture; and guiding means comprising a transporting device supported at the housing and actuable from the outside for moving the film strip loop in front of the picture aperture, and a back support formed at the guiding wall, said guiding device comprising means for guiding the loop of the endless strip such that the same intersects the optical axis only once within the area of the picture aperture arranged at the guiding wall, whereby an illumination ray path is formed through said open back side of the side chamber to the picture aperture providing unhampered access of light to the picture aperture for viewing an individual picture on a section of said film strip loop with said section disposed and guided on said guiding wall.

2. An instrument according to claim 1, in which the magazine has a narrow side facing said housing and which is confined by a flat wall interconnecting said two spaced flat sides, said flat wall comprising an extension protruding outwardly beyond one of said flat sides, said extension forming the guiding wall containing said picture aperture.

3. An instrument according to claim 1, in which said housing comprises holding means for receiving said cassette, said holding means comprising interengaging parts, guiding ribs being provided on one of the means consisting of the interengaging parts and the cassette, and complimentary grooves for receiving the ribs, being provided on the other means consisting of the interengaging parts and the cassette, and a spring-biased arresting device for fixing the position of the cassette in its predetermined position at the housing.

4. An instrument according to claim 1, comprising a spring-biased pressure plate for pressing the loop of the endless film strip against the back support formed by the guiding wall of the cassette.

5. An instrument according to claim 1, wherein said transporting means comprises a sprocket wheel mounted in said housing for engaging the film strip, and a shaft extending approximately parallel to the viewing plane of said housing.

* * * * *